Figure 1:
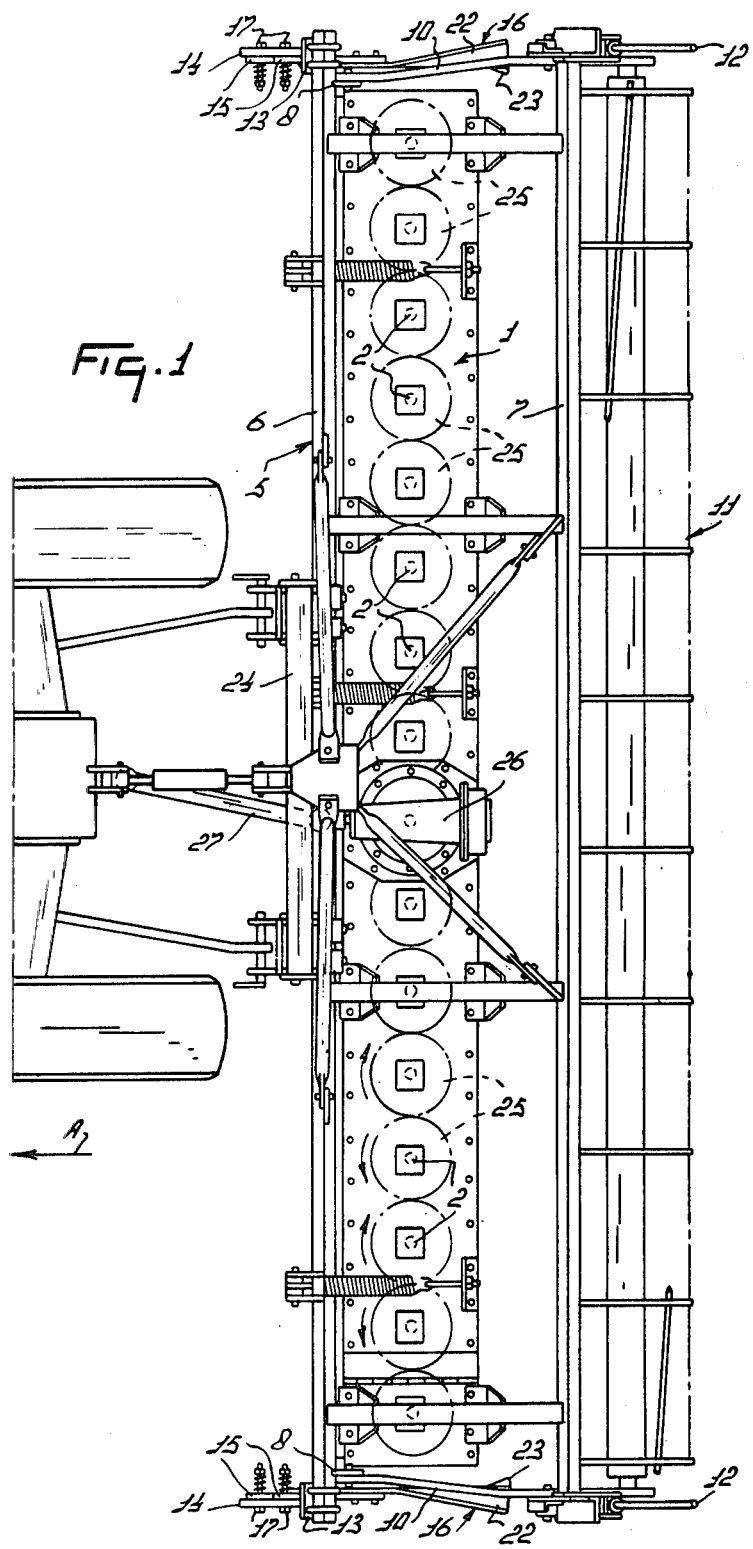

United States Patent [19]

van der Lely et al.

[11] 4,354,557
[45] Oct. 19, 1982

[54] SOIL CULTIVATING IMPLEMENT

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 190,210

[22] Filed: Sep. 24, 1980

[30] Foreign Application Priority Data

Sep. 24, 1979 [NL] Netherlands .......................... 7907081

[51] Int. Cl.³ ............................................ A01B 33/06
[52] U.S. Cl. .................................... 172/49.5; 172/112
[58] Field of Search ............... 172/509, 513, 517, 112, 172/81, 59, 49.5, 68

[56] References Cited

U.S. PATENT DOCUMENTS

| | | | |
|---|---|---|---|
| 961,591 | 6/1910 | Ertel | 172/513 |
| 1,616,225 | 2/1927 | Kloo | 172/81 X |
| 1,674,666 | 6/1928 | Sedholm | 172/509 |
| 3,426,854 | 2/1969 | Shoemaker | 172/509 |
| 3,848,677 | 11/1974 | Lely | 172/112 |
| 3,970,012 | 7/1976 | Jones | 172/112 |

FOREIGN PATENT DOCUMENTS

| | | | |
|---|---|---|---|
| 2725233 | 12/1977 | Fed. Rep. of Germany | 172/112 |
| 2817521 | 11/1978 | Fed. Rep. of Germany | 172/112 |
| 2751160 | 5/1979 | Fed. Rep. of Germany | 172/112 |

*Primary Examiner*—Richard J. Johnson
*Attorney, Agent, or Firm*—William B. Mason

[57] ABSTRACT

A cultivating implement has an elongated frame portion that mounts a row of rotors that rotate about upwardly extending axes. At the lateral sides of the frame portion, screening plates are positioned to arrest the lateral displacement of soil being worked. Each screen is substantially vertical with its front part being linked to an overlying frame structure and rear roller that supports the frame portion. Parallelogram links arranged one above the other interconnect each plate with a support part of the structure. The links extend forwardly from the plate from pivot connections to further pivot connections. The connections define horizontal transverse axes that allow the plate to move up and down as it rides along the ground. The front connections are resilient members that allow some lateral deflection of the plate. The plate has an upper, rear bent over portion that allows entry of a supporting roller arm to a pivot connection to the supporting frame structure. A lower bent portion of the plate forms a guide for the soil.

12 Claims, 3 Drawing Figures

SOIL CULTIVATING IMPLEMENT

This invention relates to soil cultivating implements or machines of the kind which comprise a plurality of soil working members that are rotatable about corresponding non-horizontal axes and that are arranged in a row which extends substantially horizontally perpendicular, or at least transverse, to the intended direction of operative travel of the implement or machine, an upright plate being movably arranged at at least one end of said row for soil working co-operation with the immediately neighbouring soil working member of that row. The term "implement(s) or machine(s)" will be shortened to "implement(s)" alone throughout the remainder of this specification for the sake of brevity.

Known implements of this kind generally operate in a very satisfactory manner but it has been found that, when working under adverse conditions and particularly with heavy and/or hard soil, the or each plate and the connections thereof to the remainder of the implement are liable to become damaged. The present invention seeks to overcome, or very significantly to reduce, this shortcoming and accordingly provides a soil cultivating implement of the kind set forth, wherein a leading region of the or each plate, with respect to the intended direction of operative travel of the implement, is pivotally linked to a supporting structure of the implement in such a way as to enable said plate to be movable upwardly and downwardly relative to that structure when the implement is in use.

Figure 2:
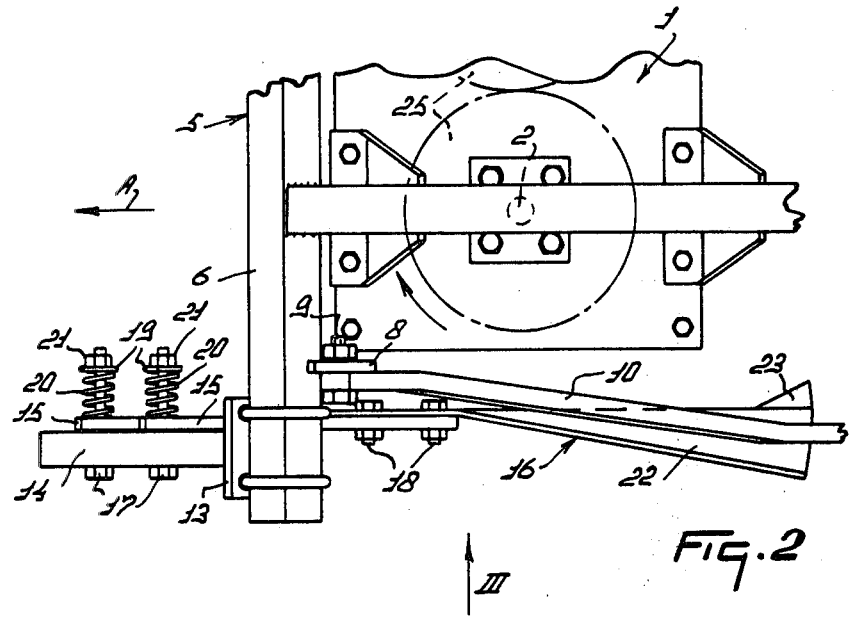
Figure 3:
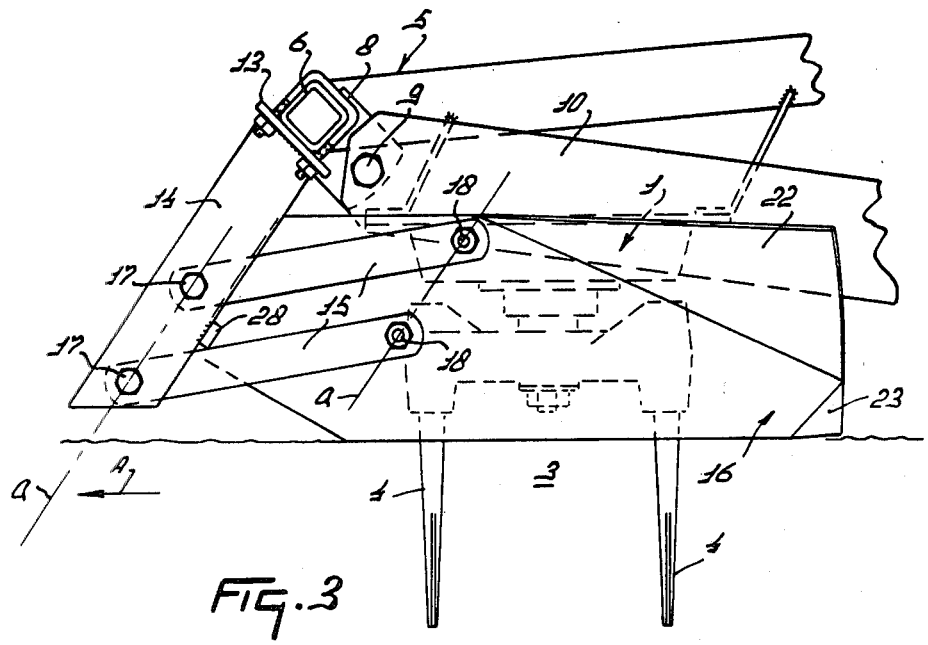

For a better understanding of the invention, and to show how the same may be carried into effect, reference will now be made, by way of example, to the accompanying drawings, in which:

FIG. 1 is a plan view of a soil cultivating implement in accordance with the invention, in the form of a rotary harrow, shown connected to the rear of an agricultural tractor, FIG. 2 is a plan view, to an enlarged scale, showing the construction and arrangement of parts at one lateral side of the implement of FIG. 1 in greater detail, and FIG. 3 is a side elevation as seen in the direction indicated by an arrow III in FIG. 2.

Referring to the accompanying drawings, the soil cultivating implement that is illustrated therein is in the form of a rotary harrow and comprises a hollow box-section frame portion 1 which extends substantially horizontally transverse to the intended direction of operative travel of the implement that is indicated in all three Figures of the drawings by an arrow A. Usually, as illustrated, the elongate frame portion 1 extends substantially horizontally perpendicular to the direction A. A plurality (in this case, sixteen) of non-horizontal shafts 2 are rotatably journalled in the hollow frame portion 1 so as to lie in a single row with their longitudinal axes (axes of rotation) spaced apart from one another at regular intervals which advantageously, but not essentially, have magnitudes of substantially 25 centimeters. Usually, as illustrated, each rotary shaft 2 will be vertically or substantially vertically disposed. The lowermost end of each shaft 2 projects downwardly from beneath the bottom of the hollow frame portion 1 where it is firmly but releasably provided with a corresponding rotary soil working member 3 (FIG. 3). Each rotary soil working member 3 comprises a substantially horizontally extending support or carrier having a central hub that is releasably secured to the lowermost end of the shaft 2 concerned, the opposite ends of said support or carrier being firmly but releasably provided with a diametrically opposed pair of rigid soil working tines 4. When the implement is in use, each soil working member 3 will cultivate a corresponding strip of soil that extends in the direction A but the spacing between the two tines 4 of each such member 3 is a little greater than is the regular distance between the axes of rotation of successive shafts 2 (preferably substantially 25 centimeters) so that the neighbouring strips of ground will overlap one another to a small extent to enable the implement, in effect, to work a single broad strip of soil which will have an overall width of substantially 4 meters in the case of the implement that is being described when a regular spacing of substantially 25 centimeters is provided between the axes of rotation of successive shafts 2. It is not, of course, essential that there should be sixteen of the shafts 2 and soil working members 3 and the invention is equally applicable to implements having greater or lesser numbers of those parts.

The hollow frame portion 1 is carried by a supporting structure that is generally indicated by the reference 5, said structure 5 comprising front and rear substantially horizontally disposed frame beams 6 and 7 that are parallel to one another but perpendicular or substantially perpendicular to the direction A. As seen in plan view (FIG. 1), the leading frame beam 6 is located closely adjacent to the front of the hollow frame portion 1 whereas the rear frame beam 7 is spaced behind the back of that frame portion 1 by a significant predetermined distance. Both frame beams 6 and 7 of the supporting structure 5 are preferably of hollow formation and square cross-section, as illustrated, and are each arranged so that one corner-to-corner diagonal of the cross-section thereof is substantially vertically disposed while the other corner-to-corner diagonal of the cross-section thereof is substantially horizontally disposed. Downwardly and rearwardly (with respect to the direction A) projecting lugs 8 are rigidly secured to the leading frame beam 6 at locations which are spaced inwardly by short distances from the opposite ends of that beam and each lug 8 has the leading end of a corresponding rearwardly projecting arm 10 connected to it by a substantially horizontal pivot bolt 9 so that the two arms 10 are displaceable upwardly and downwardly relative to the supporting structure 5. The rearmost ends of the two arms 10 lie behind the supporting structure 5 with respect to the direction A and carry substantially horizontally aligned bearings in which an openwork or cage formation ground roller 11 is mounted in a freely rotatable manner. It is not necessary to describe the construction of the roller 11 in detail for the purposes of the present invention but it is noted that it serves to support the implement from the ground surface in an upwardly and downwardly adjustable manner which is such that the maximum depth to which the tines 4 of the various soil working members 3 can penetrate into the ground is controlled. Upward and downward adjustments of the level of the roller 11 relative to that of the supporting structure 5 are effected by manually operating crank handles at the upper ends of screw-threaded spindles 12, the latter forming parts of mechanisms which interconnect locations close to the rearmost ends of the arms 10 and locations at the opposite ends of the rear frame beam 7 of the structure 5. These mechanisms are well known per se and will therefore not be described in detail for the purposes of the present invention.

Plates 13 are clamped by pairs of U-bolts to the opposite ends of the leading frame beam 6 of the supporting structure 5 and carry strong supports 14 which project downwardly and forwardly, with respect to the direction A, from the plates 13 and thus from the leading frame beam 6. Each support 14 carries vertically spaced apart upper and lower pivot bolts 17 which define corresponding substantially horizontal axes. Each pivot bolt 17 has the leading end of a corresponding arm or link 15 turnably mounted thereon and the rearmost ends of each pair of arms or links 15 are connected by a further pair of pivot bolts 18 to a corresponding shield plate 16. Each of the two symmetrically similar shield plates 16 is principally vertically or substantially vertically disposed during the operation of the implement and co-operates in working the soil with the neighbouring member 3 at one end of the row of sixteen (in this embodiment) such members 3. The co-operation between the shield plates 16 and the neighbouring soil working members 3 ensures that the soil is cultivated substantially as thoroughly at the edges of the broad strip of ground that is worked by the implement as it is at locations which are closer to the center of that broad strip. The shield plates 16 also minimise ridging of the soil at the margins of the broad strip of worked land and tend to prevent stones and other potentially damaging or injurious objects from being flung laterally of the path of travel of the implement by the rapidly rotating tines 4 of the neighbouring soil working members 3.

The lowermost edge of each shield plate 16 extends substantially horizontally forwards from the rearmost extremity thereof but a leading end region thereof is upwardly and forwardly inclined with respect to the direction A, making an obtuse angular junction with the larger substantially horizontally disposed portion (see FIG. 3). The four pivot bolts 17 and 18 by which each shield plate 16 is pivotally connected to the corresponding support 14 are disposed at the four corners of a parallelogram and it will be noted that, as seen in side elevation (FIG. 3), the pivot bolts 18 are located substantially in register, in the direction A, with the fronts of rotary soil working members 3. Planes a which contain the axes defined by the pivot bolts 17 and those defined by the pivot bolts 18, respectively, are parallel to one another and extend upwardly and rearwardly, with respect to the direction A, from the ground surface at an inclination to the horizontal which preferably, but not essentially, has a magnitude of substantially 45°. The pivot bolts 17 by which the arms or links 15 are angularly displaceably connected to the supports 14 are surrounded between stop washers 19 (FIG. 2) and the flat sides of said arms or links 15 by corresponding helical compression springs 20. The shanks of the pivot bolts 17 are screw-threaded throughout at least end regions thereof that are remote from the heads of the bolts, and nuts 21 co-operate with the screw-threads, the nuts 21 bearing against the stop washers 19 and being employable to increase or decrease the degree of compression of the springs 20 as may be required. If desired, lock nuts may be provided for co-operation with the nuts 21 to ensure that said nuts 21 cannot become loose and move progressively along the shanks of the bolts 17.

An upper rear region of each shield plate 16 is bent over upwardly and outwardly (with respect to the center of the implement) about a fold line to form a portion 22 of that plate 16 which is significantly inclined to the vertical when the implement is in use. It can be seen in FIGS. 1 and 2 of the drawings that the arms 10 are offset outwardly from front to rear by a small extent, so that the roller 11 can co-operate with substantially the whole of the broad strip of land which is cultivated by the rotary soil working members 3, and the oblique portions 22 of the two shield plates 10 are formed principally to avoid the arms 10 and shield plates 16 from fouling one another when the implement is in use. The fold lines about which the portions 22 are bent relative to the remainders of the two shield plates 16 extend obliquely upwardly and forwardly from rear to front with respect to the direction A. It will also be noted that the rearmost lower corner of each shield plate 16, with respect to the direction A, is bent over obliquely inwardly to form a guide 23 which guide tends to ensure that substantially all of the soil that is cultivated by co-operation between the shield plate 16 concerned and the immediately neighbouring rotary soil working member 3 is immediately subsequently engaged by the roller 11.

A coupling member or trestle 24 is connected to the supporting structure 5 at a location approximately midway across the working width of the implement and is of triangular or substantially triangular configuration as seen in either front or rear elevation. The coupling member or trestle 24 is constructed and arranged to enable the supporting structure 5 of the implement to be connected to the three-point lifting device or hitch at the rear of an agricultural tractor in a manner which is generally known per se and which is illustrated somewhat diagrammatically in FIG. 1 of the drawings. Each shaft 2 is provided, inside the hollow frame portion 1, with a corresponding straight-toothed or spur-toothed pinion 25, the sixteen (in this embodiment) pinions 25 being so dimensioned that the teeth of each of them are in mesh with those of the or each immediately neighbouring pinion 25 in the single row of pinions. Thus, when the implement is in use, each pinion 25, together with the corresponding shaft 2 and soil working member 3, will revolve in the opposite direction to the or each immediately neighbouring similar assembly. The directions of rotation of four such immediately neighbouring assemblies are illustrated by small arrows in FIG. 1 of the drawings. One of the center pair of shafts 2 has an upward extension through the top of the hollow frame portion 1 into a gear box 26 which is mounted on top of the frame portion 1. Shafts and pinions within the gear box 26 place said upward extension in driven connection with a rotary input shaft of the gear box 26 that projects substantially horizontally forwards from the leading end of said gear box in substantially the direction A. The rotary input shaft is splined or otherwise keyed and, when the implement is in operation, is driven from a power take-off shaft at the rear of the co-operating agricultural tractor or other vehicle by way of a telescopic transmission shaft 27, which is of a construction that is known per se, having universal joints at its opposite ends. The rear of the gear box 26 is provided with a change-speed gear which it is not necessary to describe nor to illustrate in detail for the purposes of the present invention. It suffices to say that co-operating pairs of pinions of different sizes can be employed in the change-speed gear to change the transmission ratio between the rotary input shaft of the gear box 26 and the shaft 2 whose upward extension is driven from said gear box. Thus, the rotary soil working members 3 can all be driven at a faster or slower rate, as may be required, without it being necessary to change the speed of the drive that is applied to the rotary input shaft of the gear box 26 by the telescopic transmission shaft 27.

In the use of the soil cultivating implement which has been described, its coupling member or trestle 24 is connected to the three-point lifting device or hitch at the rear of an agricultural tractor or other operating vehicle in the generally known manner which is illustrated somewhat diagrammatically in FIG. 1 of the drawings and the rear power take-off shaft of the same tractor or other operating vehicle is placed in driving connection with the rotary input shafts of the gear box 26 by way of the telescopic transmission shaft 27 which has universal joints at its opposite ends. As the implement moves forwardly over land that is to be cultivated thereby, the sixteen soil working members 3 are rotated in the opposite directions that are indicated by arrows for four of them in FIG. 1 and for one of them in FIG. 2, the tines 4 of the members 3 working overlapping strips of soil, as discussed above, to produce, in effect, a single broad strip of cultivated land having a width of substantially 4 meters in the case of the implement that is being described by way of example. The soil working members 3 at the opposite ends of the single row thereof co-operate with the shield plates 16 in working the soil, the plates 16 themselves being upwardly and downwardly displaceable, to match undulations in the surface of the ground which their lower edges may meet with during forward progress in the direction A, by turning upwardly and downwardly about the pivotal axes which are defined by the bolts 17 and 18, such upward and downward movements taking place without significant tilting due to the arms or links 15 being members of corresponding parallelogram linkages. The shield plates 16 thus maintain substantially optimum positions for co-operation with the tines 4 of the immediately neighbouring soil working members 3, said plates 16 being effectively towed forwardly by the arms or links 15 which are connected to leading regions thereof at the positions of the pivot bolts 18. The arms or links 15 extend approximately parallel to the direction A and it is noted that, in addition to being upwardly and downwardly displaceable, the shield plates 16 can deflect laterally to some extent against the resilient opposition of the helical compression springs 20. Damage can thus be substantially avoided if, for example, a large stone should be momentarily trapped between one of the shield plates 16 and one of the tines 4 of the immediately neighbouring soil working member 3. Moreover, the springs 20 are adjustable in effect to regulate the counter-pressure of the shield plates 16 against soil displaced by the immediately neighbouring members 3 to ensure that such soil is adequately crumbled. Purely for example, when cultivating heavy soil, the nuts 21 are preferably moved towards the heads of the bolts 17 to increase the compression of the springs 20 and thus the counter-pressure of the plates 16 to ensure adequate soil crumbling. When lighter soils are to be dealt with, the compression springs 20 are preferably relaxed to some extent. If one of the plates 16 should be deflected outwardly by a stone, as discussed above, against the action of the corresponding springs 20, that plate is substantially immediately returned to its normal position by the springs 20 and arms or links 15 so that only a very momentary interruption, if any, of the cultivating action takes place.

When the implement is raised clear of the ground by the three-point lifting device or hitch of the associated agricultural or other operating vehicle for inoperative transport purposes, the upper arms or links 15 of the two pairs co-operate with stops 28 on the supports 14 to prevent excessive downward turning movements of the shield plates 16. The same stops 28 prevent the shield plates 16 from moving too far upwardly during operation of the implement.

Although certain features of the soil cultivating implement that have been described and/or that are illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

We claim:

1. A soil cultivating implement comprising a frame structure and a row of soil working members mounted on an elongated portion of said structure, said portion extending transverse to the direction of implement travel, an upwardly extending screening plate positioned adjacent at least one lateral side of said frame portion and said plate being pivoted to said structure by links, said links being spaced apart and positioned one above the other, said links extending forwardly from pivot connections to said plate to a support on said structure, a plane containing the pivotal connections of said links to said plate being inclined upwardly and rearwardly with respect to the normal direction of implement travel, said plate being normally positioned to ride along the ground during travel and being freely displaceable upwardly and downwardly about said pivot connections responsive to ground undulations without tilting, said pivot connections defining substantially horizontal axes that extend transverse to the direction of travel, an elongated roller being positioned to the rear of said soil working members, the lateral ends of said roller being pivoted to the supporting structure by corresponding arms, said plate having an obliquely bent-over upper portion that is substantially vertically in register with a respective arm to avoid fouling the arm.

2. An implement as claimed in claim 1, wherein the pivot connections of the links to said support each comprise a resilient mechanism.

3. An implement as claimed in claim 2, wherein said pivot connections each include a pivot bolt that mounts a compression spring surrounding the bolt to resist the lateral displacement of said plates.

4. An implement as claimed in claim 1, wherein the lower edge of said plate extends substantially horizontally to join an upwardly and forwardly inclined front edge.

5. An implement as claimed in claim 1, wherein the bent-over upper portion of each plate extends forwardly from the rear thereof to beyond its center.

6. An implement as claimed in claim 5, wherein said upper portion is bent over about a fold line inclined downwardly and rearwardly from the upper edge of said plate.

7. An implement as claimed in claim 6, wherein said fold line meets the rear edge of the plate at a horizontal level lower than the center of said plate.

8. An implement as claimed in claim 6, wherein the rearmost and lowermost corner of the plate is configured as an obliquely inwardly bent-over guide.

9. An implement as claimed in claim 8, wherein said guide is bent over along a respective fold line which intersects the first mentioned fold line of said upper portion.

10. An implement as claimed in claim 1, wherein said support is rigidly fixed to a forward beam of said structure and said support being inclined forwardly and downwardly from said beam in front of said plate.

11. A soil cultivating implement comprising a frame structure and a row of soil working members mounted on an elongated portion of said structure, said portion extending transverse to the direction of implement travel, an upwardly extending screening plate positioned adjacent at least one lateral side of said frame portion and said plate being pivoted to said structure by parallel links, said links being spaced apart and positioned one above the other to form a parallelogram linkage, said links extending forwardly from said pivot connection to said plate to a downwardly extending support of said structure, a place containing the pivotal connections of said links to said plate being inclined upwardly and rearwardly with respect to the normal direction of travel, said plate being connected to normally ride along the ground during travel, said plate being freely displaceable upwardly and downwardly about said pivot connections responsive to ground undulations without tilting, said pivot connections defining substantially horizontal pivot axes that extend transverse to the direction of travel, an elongated ground roller being positioned to the rear of said soil working means, the lateral ends of said roller being pivoted to the supporting structure by corresponding arms, said plate having an obliquely bent-over upper portion that is substantially vertically in register with a respective arm to avoid fouling.

12. An implement as claimed in claim 11, wherein a stop on the forward part of said plate cooperates with said structure to prevent the plate from being excessively displaced relative to the frame structure.

* * * * *